US008669919B2

(12) United States Patent
Ono

(10) Patent No.: US 8,669,919 B2
(45) Date of Patent: Mar. 11, 2014

(54) HEAD MOUNTED DISPLAY DEVICE

(75) Inventor: Takatoshi Ono, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 597 days.

(21) Appl. No.: 12/955,497

(22) Filed: Nov. 29, 2010

(65) Prior Publication Data
US 2011/0128209 A1 Jun. 2, 2011

(30) Foreign Application Priority Data

Dec. 1, 2009 (JP) ................................ 2009-273612

(51) Int. Cl.
G09G 5/00 (2006.01)

(52) U.S. Cl.
USPC ............................................................ 345/8

(58) Field of Classification Search
USPC .................................................... 345/7, 8, 9
See application file for complete search history.

(56) References Cited

U.S. PATENT DOCUMENTS

| 5,491,510 | A | * | 2/1996 | Gove | 348/77 |
| 5,889,916 | A | * | 3/1999 | Kimura et al. | 386/241 |
| 6,064,749 | A | * | 5/2000 | Hirota et al. | 382/103 |
| 6,175,343 | B1 | * | 1/2001 | Mitchell et al. | 345/8 |
| 6,507,359 | B1 | * | 1/2003 | Muramoto et al. | 348/47 |
| 7,907,200 | B2 | * | 3/2011 | Yanagisawa | 348/333.01 |
| 7,959,300 | B2 | * | 6/2011 | Hirahara et al. | 353/69 |
| 8,138,991 | B2 | * | 3/2012 | Rorberg et al. | 345/8 |
| 8,427,557 | B2 | * | 4/2013 | Kanade et al. | 348/241 |
| 2002/0075201 | A1 | * | 6/2002 | Sauer et al. | 345/7 |
| 2004/0119662 | A1 | * | 6/2004 | Dempski | 345/8 |
| 2008/0246693 | A1 | * | 10/2008 | Hailpern et al. | 345/8 |
| 2009/0184889 | A1 | * | 7/2009 | Kier et al. | 345/8 |
| 2009/0303159 | A1 | * | 12/2009 | Gustafsson et al. | 345/8 |
| 2010/0026714 | A1 | * | 2/2010 | Utagawa | 345/633 |
| 2010/0060552 | A1 | * | 3/2010 | Watanabe et al. | 345/8 |
| 2010/0141555 | A1 | * | 6/2010 | Rorberg et al. | 345/8 |

FOREIGN PATENT DOCUMENTS

| JP | A-09-200680 | 7/1997 |
| JP | A-11-249587 | 9/1999 |

* cited by examiner

Primary Examiner — Tom Sheng
(74) Attorney, Agent, or Firm — Oliff PLC

(57) ABSTRACT

A head mounted display device including:
an image display that is mounted on the head of a user to permit the user to visually recognize an image;
a determination unit that, when any other unitary moving images correlated with the same unitary display image corresponding to one of the unitary moving images are generated, determines whether to replace the one of the unitary moving images with the any other unitary moving images; and
a continual moving image display that, when the determination unit determines that the one of the unitary moving images should be replaced with the any other unitary moving images, replaces the one of the unitary moving images with the any other unitary moving images to generate those replaced unitary moving images as one coherent continual moving image.

9 Claims, 12 Drawing Sheets

FIG. 12

| MANUAL FILE | START POINT | END POINT | PRIORITY |
|---|---|---|---|
| 701 | 2009:10:30:11:30:02 | 2009:10:30:11:31:45 | 1 |
| 702 | 2009:10:30:11:31:46 | 2009:10:30:11:33:10 | 1 |
| 703 | 2009:10:30:11:33:11 | 2009:10:30:11:33:13 | 1 |
| 704 | 2009:10:30:11:33:14 | 2009:10:30:11:37:21 | 1 |
| 702 | 2009:10:30:11:37:22 | 2009:10:30:11:40:11 | 1 |
| 701 | 2009:10:30:11:40:12 | 2009:10:30:11:41:15 | 2 |
| ... | ... | ... | ... |

HEAD MOUNTED DISPLAY DEVICE

BACKGROUND OF THE DISCLOSURE

1. Field of the Disclosure

The present invention relates to a head mounted display device that provides a user with information and, at the same time, take an image in a direction of his field of view.

2. Description of the Related Art

Conventionally, a head mounted display device is known that is mounted on the head of a worker so that he may visually recognize work contents (e.g., manual). Such a head mounted display device displays the manual in the view field of the worker, so that he can always check the manual while working. This leads to improvements in certainty of the work. Further, he need not hold the manual in his hand and so the working efficiency is highly improved.

Also, conventionally, such a video data recording apparatus has been proposed as to record a recording start point and a recording end point in order to speed up the retrieval and editing of stored moving images.

SUMMARY OF THE DISCLOSURE

There are some cases where it is desired to take moving images as working record for the guidance of techniques which require proficiency and those as a good example for workers who would repeat constant work. However, there may be a case where the worker would like to retake some of the working record images in order to explain the work more easily or because he has failed in work during shooting of those images. According to the conventional methods, it has been necessary to cut off the moving images of the failed positions and splice those of the successful positions together after the end of shooting. Editing positions such as the failed positions and the successful positions would need to be searched for by the worker. Therefore, the conventional methods have suffered a problem in that they would spend much labor and time.

When the aforesaid video data recording apparatus is used, the recording start and end points will be recorded. Therefore the labor of the worker looking for the editing positions can be reduced. However, it also needs after-the-fact work of editing and so still suffers a problem in that some labor and time must be spent in the editing work.

It is an object of the present invention to provide a head mounted display device that solves those problems and enables generating desired moving images without a necessity of after-the-fact editing work.

To solve the problems, an aspect of the disclosure provides a head mounted display device including:

an image display that is mounted on the head of a user to permit the user to visually recognize an image;

an imager that takes an image in a direction of a field of view of the user and generates a taken moving image;

a processor configured to execute instructions grouped into functional units, the instructions including:

a unitary display image data acquisition unit that acquires unitary display image data which is to be displayed on the image display;

a unitary moving image display that generates a unitary moving image correlated with the unitary display image from the moving image generated by the imager for each of the unitary display images which are displayed on the image display;

a determination unit that, when any other unitary moving images correlated with the same unitary display image corresponding to one of the unitary moving images are generated, determines whether to replace the one of the unitary moving images with the any other unitary moving images; and a continual moving image display that, when the determination unit determines that the one of the unitary moving images should be replaced with the any other unitary moving images, replaces the one of the unitary moving images with the any other unitary moving images to generate those replaced unitary moving images as one coherent continual moving image.

BRIEF DESCRIPTION OF THE DRAWINGS

For a more complete understanding of the invention, the needs satisfied thereby, and the objects, features, and advantages thereof, reference now is made to the following description taken in connection with the accompanying drawings.

FIG. 12 is an explanatory table of a start point/end point file.

DETAILED DESCRIPTION OF THE INVENTION (Outline of Head Mounted Display Device of the Embodiments)

Figure 1:
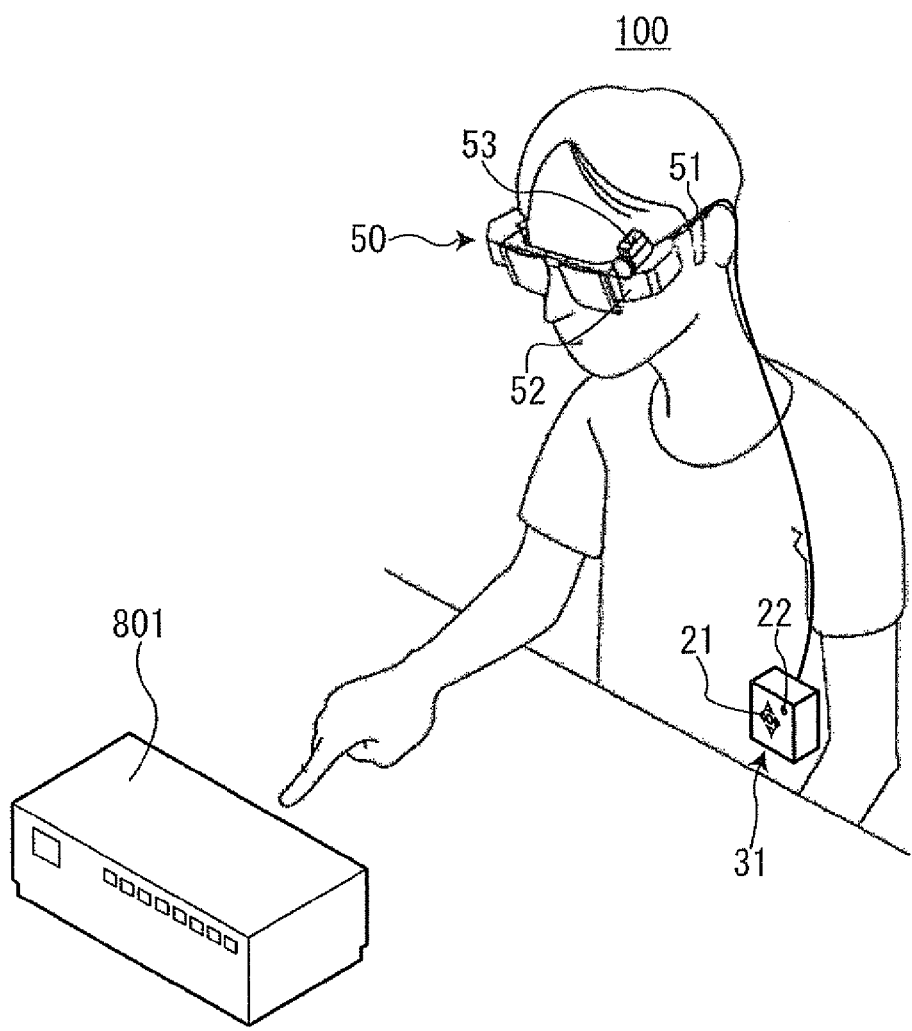
FIG. 1 is a schematic view of a head mounted display device showing an embodiment of the present invention.

Hereinafter, a description will be given of preferred embodiments of the present invention with reference to the drawings. A head mounted display device 100 includes a head mounted display device unit 50 that is mounted on the head of a user and a control unit 31 that controls the head mounted display device unit 50. The head mounted display device unit 50 includes a head-worn unit 51, an image display 52, and an imager 53. The head-worn unit 51 is shaped like an eyeglass frame in the embodiment shown in FIG. 1. However, the head-worn unit 51 only needs to be of such a structure like a helmet wearable on the user's head.

Figure 2:
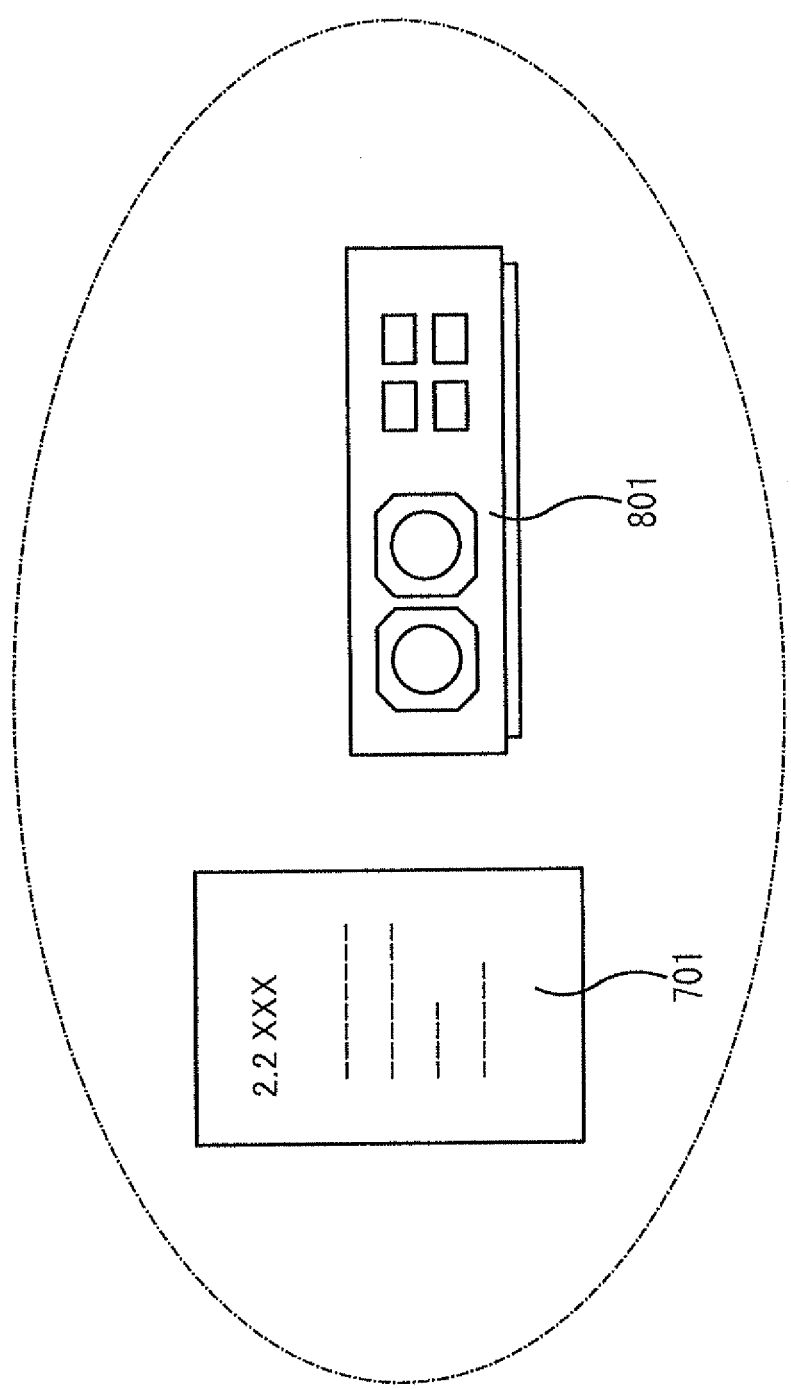
FIG. 2 is an illustration showing a view field of a user (1st embodiment)

The image display 52 is attached to the side front portion of the head-worn unit 51. The image display 52 generates an image and permits the user to visually recognize the image. In the present embodiment, the image display 52 is configured of a retina scanning type display that permits the user to visually recognize the image by applying a scanning laser beam directly to the eyeball of the user. However, the image display 52 may as well come in an LCD, an organic electroluminescence (EL) display, or any other device. The aforesaid image is a manual 701 (see FIG. 2) in the present embodiment. As shown in FIG. 2, the user can visually recognize the manual 701 shown on the image display 52 and, simultaneously, a working target 801 present in an outside world.

The imager 53 is attached to the front portion of the head-worn unit 51. The imager 53 is a device that takes images in the view field direction of the user. The imager 53 includes an image sensor and an imaging optics. The image sensor includes photodiodes arranged 2-dimensionally. The photodiodes each convert the intensity of incident light into the quantity of charge and outputs it as a "signal voltage." The image sensor includes a charge coupled device image sensor (CCD) and a complementary metal oxide semiconductor (CMOS). The imaging optics is configured of a single or a plurality of lenses, to focus an incoming image on the image sensor.

The control unit 31 is connected to the image display 52 and the imager 53. The control unit 31 is worn to, for example, the waist of the user. The control unit 31 includes an operating device 21 and a power lamp 22. The operating device 21 is used to operate the head mounted display device 100 and configured of a plurality of buttons or a touch panel. The power lamp 22 is configured of, for example, an LED and arranged to emit light when power is applied to the head mounted display device 100.

Figure 3:
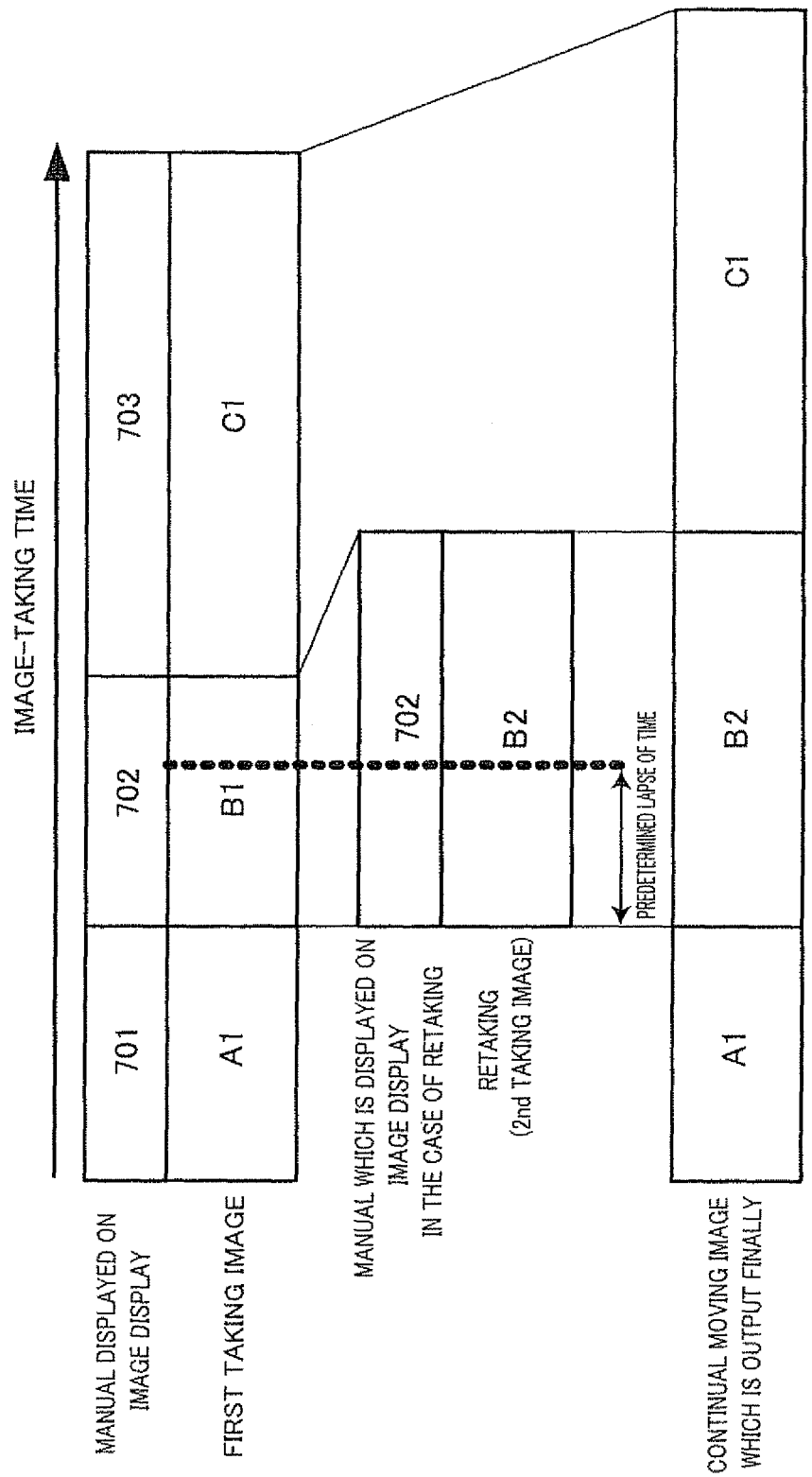
FIG. 3 is an explanatory diagram showing a process in which a continual moving image is generated from unitary moving images.

A description will be given of the outline of the head mounted display device 100 according to the present invention with reference to FIG. 3. The user sequentially selects the manuals 701 to 703 by operating the operating device 21. When the manuals 701 to 703 appear on the image display 52, the imager 53 takes images in the user's view field direction at the same time. Then, unitary moving images A1, B1, and C1 corresponding to the manuals 701 to 703 respectively are generated and stored in the control unit 31.

When the user would like to retake the unitary moving image corresponding to the manual 702, he will operate the operating device 21 so that the manual 702 may be displayed on the image display 52 again. Then, the manual 702 appears on the image display 52, and, at the same time, the imager 53 starts to take image. Then, the user operates the operating device 21, to stop the display of the manual 702 on the image display 52 and, at the same time, the imager 53 quits taking image. When imager 53 quits taking image, a unitary moving image B2 correlated with the manual 702 is generated and stored in the control unit 31. Then, it is determined as to whether to replace the unitary moving image B1 with the retaken unitary moving image B2. When it is determined that the unitary moving image B1 should be replaced with the retaken unitary moving image B2, the unitary moving image B1 is replaced with the retaken unitary moving image 32, so that the unitary moving images A1, B2 and C1 are spliced together to generate a "continual moving image."

Hereinafter, a description will be given in detail of the configuration of the head mounted display device 100 that realizes those functions.

(Block Diagram of Head Mounted Display Device)

Figure 4:
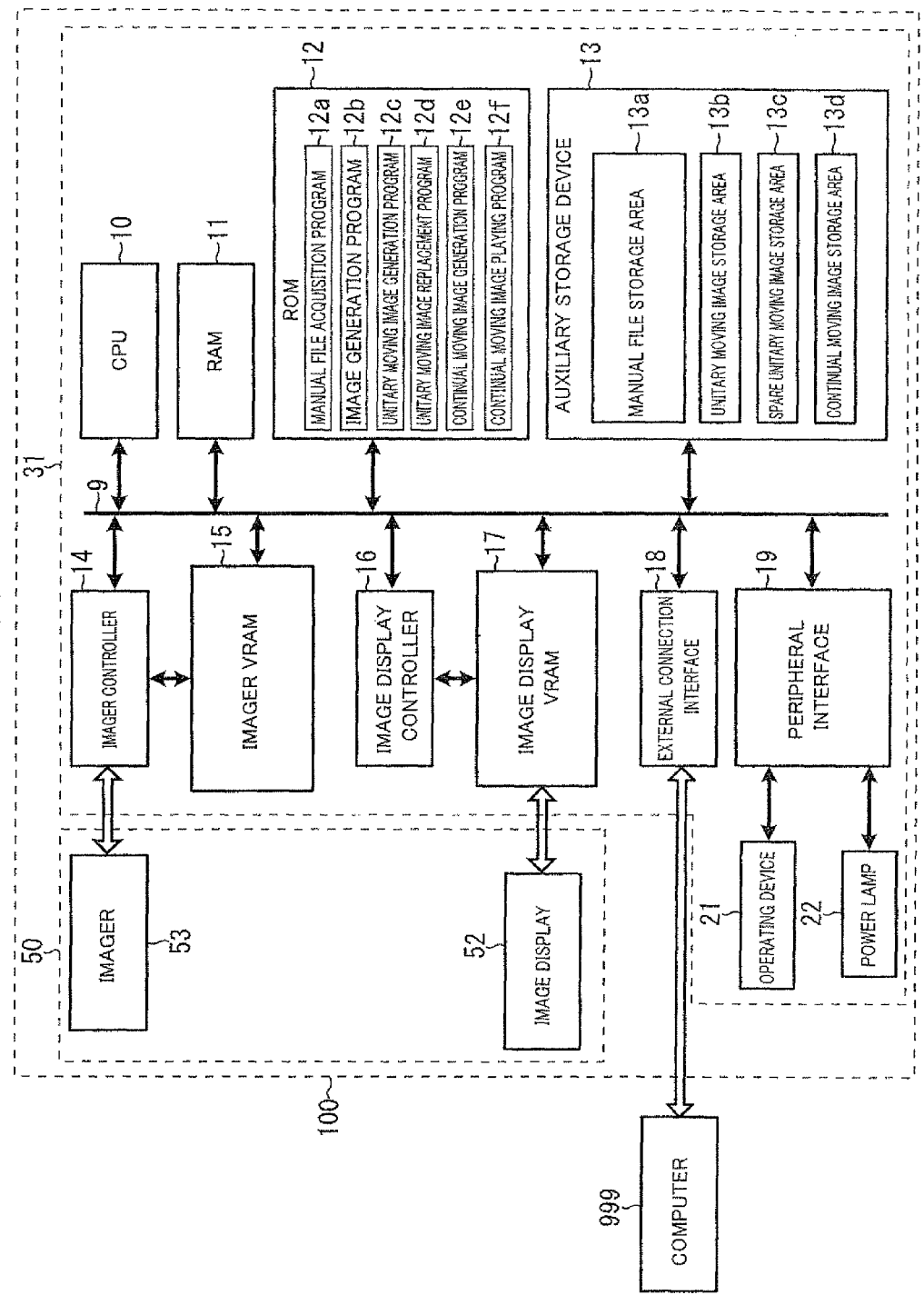
FIG. 4 is a block diagram of the head mounted display device according to the 1st embodiment.

A description will be given of the head mounted display device 100 according to the 1st embodiment with reference to FIG. 4. The control unit 31 includes a CPU 10, a RAM 11, a ROM 12, an auxiliary storage device 13, an imager controller 14, an imager VRAM 15, an image display controller 16, an image display VRAM 17, an external connection interface 18, and a peripheral interface 19, which are connected mutually using a bus 9. The imager controller 14 and the imager VRAM 15 are connected to each other. The image display controller 16 and the image display VRAM 17 are also connected to each other. The imager controller 14 and the imager 53 are connected to each other. The image display VRAM 17 and the image display 52 are connected to each other.

The CPU 10 performs a variety of operations and processing in cooperation with the RAM 11 and the ROM 12.

The RAM 11 temporarily stores programs which are processed in the CPU 10 and data which is processed by the CPU 10 in its address space.

The ROM 12 stores beforehand a variety of programs and parameters which control the head mounted display device 100. The variety of functions are realized by the CPU 10 when it processes those various programs. The ROM 12 stores beforehand a manual file acquisition program 12a, an image generation program 12b, a unitary moving image generation program 12c, a unitary moving image replacement program 12d, a continual moving image generation program 12e, and a continual moving image playing program 12f. It should be noted that those programs and data pieces may be stored in the auxiliary storage device 13.

The manual file acquisition program 12a is used to acquire a "manual file" stored in a manual file storage area 13a when it is selected by the user.

The image generation program 12b is used to output to the image display controller 16 a drawing instruction that commands generating "display image data" from the "manual file."

The unitary moving image generation program 12c is used to generate a "unitary moving image" correlated with a "manual file" from a "taken moving image" generated by the imager controller 14 each time this "manual file" is displayed on the image display 52. The generated "unitary moving image" is stored in a unitary moving image storage area 13b in the auxiliary storage device 13.

The unitary moving image replacement program 12d is used to, when any other unitary moving image correlated with the same unitary display image corresponding to 1 of the unitary moving images stored in the unitary moving image storage area 13b is newly generated, determine whether to replace this 1 of the "unitary moving images" with the any "other unitary moving image" and, when having determined so, replace this 1 of the "unitary moving images" with the any "other unitary moving image."

The continual moving image generation program 12e is used to generate one coherent "continual moving image" from "unitary moving images."

The continual moving image playing program 12f is used to output to the image display controller 16 a drawing instruction that commands the image display 52 to display a "continual moving image" and a "manual file" corresponding to "unitary moving images" that constitute this "continual moving image" in a condition where they are positioned in parallel with each other.

It should be noted that the manual file acquisition program 12a, the image generation program 12b, the unitary moving image generation program 12c, the unitary moving image replacement program 12d, the continual moving image generation program 12e, and the continual moving image playing program 12f may be configured of an ASIC (Application Specific Integrated Circuit).

The auxiliary storage device 13 may come in, for example, a non-volatile memory or a hard disk. The auxiliary storage device 13 includes the manual file storage area 13a, the unitary moving image storage area 13b, a spare unitary moving image storage area 13c, and a continual moving image storage area 13d.

The manual file storage area 13a stores beforehand a variety of "manual files." The file format of the "manual files" includes a variety of files such as a still image file, a moving image file, and a text file.

The unitary moving image storage area 13b is arranged to store "unitary moving images" correlated with a "manual file."

The spare unitary moving image storage area 13c stores an "old unitary moving image." The "old moving image" refers to a "unitary moving image" stored in the unitary moving image storage area 13b and to be replaced with a newly retaken "unitary moving image" in a case where retaking has been performed on a "manual file" corresponding to this stored "unitary moving image."

The imager controller 14 includes an A/D converter and a DSP (Digital Signal Processor). The A/D converter converts a "signal voltage" output by the imager 53 into a "digital signal." The DSP generates a "taken moving image" by expressing gradations of the respective R-, G-, and B-colors from the "digital signal" generated by the A/D converter and stores it in the imager VRAM 15.

The image display controller 16 includes a GPU (Graphics Processing Unit), to receive an instruction from the CPU 10 for execution of the image generation program 12b and then generate "display image data" to be displayed on the image display 52 from the "manual file" stored in the manual file storage area 13a and store it in the image display VRAM 17. The "display image data" stored in the image display VRAM 17 is output to the image display 52 as an "image signal."

The external connection interface 18 connects to a computer 999. The computer 999 includes a personal computer or a PDA. The external connection interface 18 includes a LAN (Local Area Network), a USB (Universal Serial Bus), or any other communication interface.

The peripheral interface 19 converts the physical and logical format of signals. The peripheral interface 19 is connected the operating device 21 and the power lamp 22. When operated by the user, the operating device 21 turns the head mounted display device 100 on (into a condition where power is applied) or off (into a condition where power is cut off) or switches a "manual file" to be displayed on the image display 52. The power lamp 22 comes on when the head mounted display device 100 is in the on-state.

(Explanation of Flow of Continual Moving Image Generation Processing)

Figure 5:
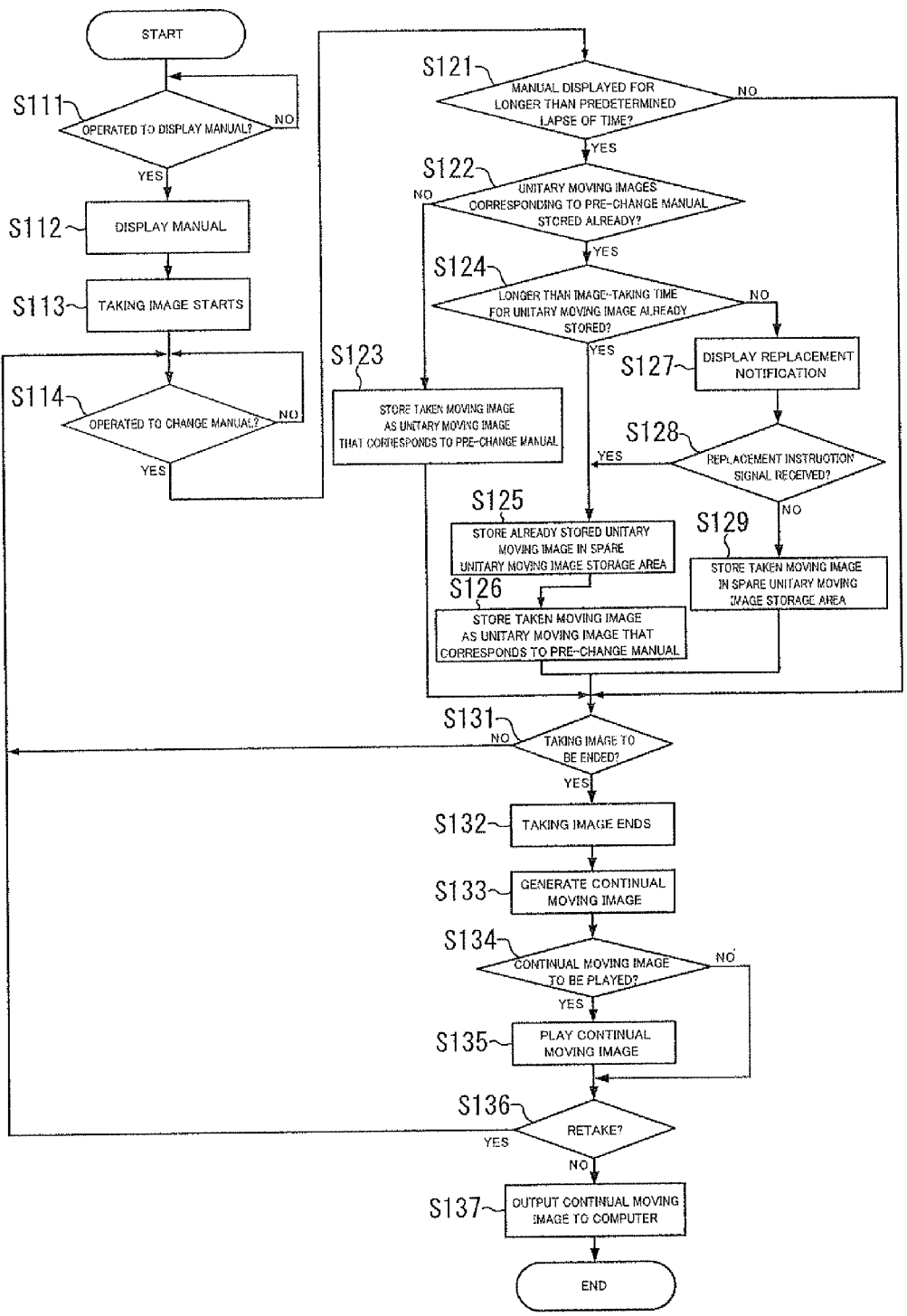
FIG. 5 is a flowchart of continual moving image generation processing according to the 1st embodiment.

A description will be given of the flow of the "continual moving image generation processing" according to the 1st embodiment with reference to FIG. 5. In the continual moving image generation processing according to the 1st embodiment, each time a "manual file" displayed on the image display 52 is switched through the operations of the operating device 21 by the user, "unitary moving images" correlated with the "manual file" are generated.

When power is applied to the head mounted display device 100 through the operations of the operating device 21 by the user, the process advances to the processing in S111.

In the processing in S111, when the CPU 10 executing the manual file acquisition program 12a detects an "operation signal" that commands the image display 52 to display the "manual file" through the operations of the operating device 21 by the user (YES in S111), the process advances to the processing in S112.

In the processing in S112, the CPU 10 executing the manual file acquisition program 12a acquires a "manual file" stored in the manual file storage area 13a based on the "operation signal" detected in the determination in S111. Next, the CPU 10 executing the image generation program 12b outputs to the image display controller 16 a drawing instruction that commands generating "display image data" from the "manual file" acquired by the CPU 10 executing the manual file acquisition program 12a. The generated "display image data" is output as an "image signal" to the image display 52 so that the manual 701 is displayed on the image display 52 (see FIG. 2). When the processing in S112 ends, the process advances to the processing in S113.

In the processing in step S113, the CPU 10 outputs an instruction to the imager controller 14 so that it commands the imager 53 to start taking image. The imager controller 14 generates a "taken moving image" and stores it in an imager VRAM 15. When the processing in S113 ends, the process advances to the processing in S114.

In the processing in S114, the CPU 10 executing the manual file acquisition program 12a determines whether or not the "operation signal" is output by the user operating the operating device 21, thereby determining whether or not operations are made to change the "manual file" to be displayed on the image display 52. When the CPU 10 executing the manual file acquisition program 12a determines that operations have been made to change the "manual file" (YES in S114), the CPU 10 executing the image generation program 12b outputs to the image display controller 16 a drawing instruction that commands generating "display image data" from the "manual file" selected by the user, and the process advances to the processing in S121.

In the processing in S121, the CPU 10 executing the unitary moving image generation program 12c determines whether or not the post-change "manual file" has been displayed on the image display 52 for longer than a predetermined lapse of time. When the CPU 10 executing the unitary moving image generation program 12c determines that the post-change "manual file" has been displayed on the image display 52 for longer than the predetermined lapse of time (YES in S121), the process advances to the processing in S122. On the other hand, when the CPU 10 executing the unitary moving image generation program 12c determines that the pre-change "manual file" has been displayed on the image display 52 only for a lapse of time shorter than the predetermined lapse of time (NO in S121), the process advances to the processing in S131.

That is, in a case where the user is searching for a "manual file" desired to be displayed on the image display 52 by operating the operating device 21, the "manual file" will be displayed on the image display 52 for a short period of time (in other words, will be taken only for a short lapse of time). In this case, the "taken moving image" need not be stored as a "unitary moving image", so that the generated "taken moving images" are abandoned. In such a manner, the short-time unitary moving image that need not be stored will not be stored unnecessarily.

In the processing in S122, the CPU 10 executing the unitary moving image generation program 12c determines whether or not the "unitary moving images" corresponding to the pre-change "manual file" are stored in the unitary moving image storage area 13b. When the CPU 10 executing the unitary moving image generation program 12c determines that the "unitary moving images" are stored in the unitary moving image storage area 13b (YES in S122), the process advances to the processing in S124. On the other hand, if the CPU 10 executing the unitary moving image generation program 12c determines that the "unitary moving images" are not stored in the unitary moving image storage area 13b (NO in S122), the process advances to the processing in S123.

In the processing in S123, the CPU 10 executing the unitary moving image generation program 12c generates the "taken moving image" generated before changing of the "manual file" as "unitary moving images" corresponding to the pre-change "manual file" and stores them in the unitary moving image storage area 13b. When the processing in S123 ends, the process advances to the processing in S131.

In the processing in S124, the CPU 10 executing the unitary moving image replacement program 12d determines whether or not a lapse of time spent to take a newly generated "unitary moving image" is longer than that spent to take the "unitary moving image" corresponding to the same "manual file" stored in the unitary moving image storage area 13b. When the CPU 10 executing the unitary moving image replacement program 12d determines that the lapse of time spent to take the newly generated "unitary moving image" is longer than the other (YES in S124), the process advances to the processing in S125. On the other hand, if the CPU 10 executing the unitary moving image replacement program 12d determines that the lapse of time spent to take the newly generated "unitary moving image" is shorter than the other (NO in S124), the process advances to the processing in S127. In an example shown in FIG. 3, the lapse of time spent to take the newly generated unitary moving image 32 is longer than that spent to take the unitary moving image B1 corresponding to the manual 702 stored in the unitary moving image storage area 13b, so that the process advances to the processing in S125. When retaking has been performed on the same "manual file" and when the retaken "unitary moving image" is longer in terms of time than the unitary moving image" already stored, it is assumed that the retaken "unitary moving image" describes the operation in more details and is more valuable to be stored than the other. Therefore, in the processing in S124, the CPU 10 executing the unitary moving image replacement program 12d determines whether or not a lapse of time spent to take a newly generated "unitary moving image" is longer than that spent to take the "unitary moving image" corresponding to the same "manual file" stored in the unitary moving image storage area 13b. In such a manner, a "continual moving image" made of "unitary moving images" that are longer in shooting time and more valuable to be recorded is generated automatically.

In the processing in S125, the CPU 10 executing the unitary moving image replacement program 12d stores the "unitary moving images" that are compared in the processing in S124 and already stored in the unitary moving image storage area 13b into the spare unitary moving image storage area 13c and, at the same time, erases them from the unitary moving image storage area 13b. In the example shown in FIG. 3, the CPU 10 executing the unitary moving image replacement program 12d stores the unitary moving image B1 in spare unitary moving image storage area 13c and, at the same time, erases it from the unitary moving image storage area 13b. When the processing in S125 ends, the process advances to the processing in S126. The processing in S125 enables utilizing the "unitary moving images" that have not been used as a "continual moving image."

In the processing in S126, the CPU 10 executing the unitary moving image generation program 12c generates the "taken moving image" that has been generated up to a point in time when the "manual file" was changed, as "unitary moving images" corresponding to the pre-change "manual file." Then, the CPU 10 executing the unitary moving image replacement program 12d causes those generated "unitary moving images" to be stored in the unitary moving image storage area 13b. In the example shown in FIG. 3, the CPU 10 executing the unitary moving image generation program 12c generates the unitary moving images B2 corresponding to the manual 702, then the CPU 10 executing the unitary moving image replacement program 12d causes the unitary moving images B2 to be stored in the storage area 13b. When the processing in S126 ends, the process advances to the processing in S131.

In the processing in S127, the CPU 10 executing the unitary moving image replacement program 12d outputs to the image display controller 16 a drawing instruction that commands the image display 52 to display "replacement notification." When the processing in S127 ends, the process advances to the processing in S128.

In the processing in S128, the CPU 10 executing the unitary moving image replacement program 12d determines whether or not a "replacement instruction signal" is received via the peripheral interface 19. When the CPU 10 executing the unitary moving image replacement program 12d determines that the "replacement instruction signal" has been received through the operations of the operating device 21 by the user (YES in S128), the process advances to the processing in S125. On the other hand, if the CPU 10 executing the unitary moving image replacement program 12d determines that the "replacement instruction signal" is not received within a valid period of a predetermined lapse of time (several seconds) (NO in S128), the process advances to the processing in 51.29. In the processing in S128, through the operations of the operating device 21 by the user, the "unitary moving images" that the user desires can be selected.

In the processing in S129, the CPU 10 executing the unitary moving image generation program 12b causes the "taken moving images" generated up to a point in time when the "manual file" was changed to be stored as "unitary moving images" in the spare unitary moving image storage area 13c. When the processing in S129 ends, the process advances to the processing in S131. The processing in S129 enables utilizing the "unitary moving images" that have not been used as a "continual moving image."

In the processing in S131, the CPU 10 determines whether or not an "taking image end signal" is received via the peripheral interface 19. When the CPU 10 determines that the "taking image end signal" has been received through the operations of the operating device 21 by the user (YES in S131), the process advances to the processing in S132. On the other hand, if the CPU 10 determines that the "taking image end signal" is not received (NO in S131), the process advances to the processing in S114.

In the processing in S132, the CPU 10 outputs to the imager controller 14 an instruction that commands taking image by the imager 53 to stop taking image. When the processing in S132 ends, the process advances to the processing in S133.

In the processing in S133, the CPU 10 executing the continual moving image generation program 12e splices together the "unitary moving images" stored in the unitary moving image storage area 13b, to generate one coherent (one file of) "continual moving image." The generated "continual moving image" is stored in the continual moving image storage area 13d. In the example shown in FIG. 3, the CPU 10 executing the continual moving image generation program 12e splices the unitary moving image A1, the replaced unitary moving image B2, and the unitary moving image C1 together into one file to generate a "continual moving image" and stores it in the continual moving image storage area 13d. When the processing in S133 ends, the process advances to the processing in S134.

In the processing in S134, the CPU 10 determines whether or not the "continual moving image generation signal" is received via the peripheral interface 19. When the CPU 10 determines that the "continual moving image generation signal" has been received through the operations of the operating device 21 by the user (YES in S134), the process advances to the processing in S135. On the other hand, when the CPU 10 determines that the "continual moving image generation signal" is not received (NO in S134), the process returns to the processing in S136.

In the processing in S135, the CPU 10 executing the continual moving image playing program 12f outputs to the image display controller 16 a drawing instruction that commands the image display 52 to display the "continual moving image" stored in the continual moving image storage area 13d and a "manual file" corresponding to "unitary moving images" that constitute this "continual moving image" in a condition where they are positioned in parallel with each other. The user can confirm the outcome of the completed "continual moving image" by simultaneously viewing the "continual moving image" and the "manual file" displayed on the image display 52 in a condition where they are positioned in parallel with each other. When the processing in S135 ends, the process advances to the processing in S136.

In the processing in S136, the CPU 10 determines whether or not a "retaking instruction signal" is received via the peripheral interface 19. When the CPU 10 determines that the "retaking instruction signal" has been received through the operations of the operating device 21 by the user (YES in S136), the process returns to the processing in S114. On the other hand, when the CPU 10 determines that the "retaking instruction signal" is not received (NO in S136), the process advances to the processing in S137.

In the processing in S137, the "continual moving image" stored in the continual moving image storage area 13d is output to the computer 999 via the external connection interface 18. When the processing in S137 ends, the "continual moving image generation processing" ends, to cut off power on the head mounted display device 100.

In such a manner, the present invention enables generating a desired moving image associated with a file which is displayed on the image display 52 without the necessity of performing after-the-fact editing work.

(Outline of the Head Mounted Display Device of Another Embodiment)

Hereinafter, a description will be given of a head mounted display device 200 of a 2nd embodiment on its differences from the head mounted display device 100 of the 1st embodiment. In the present embodiment, when the user views in a direction (see FIG. 8) of a working target 801, an imager 53 images the working target 801. Then, a CPU 10 (see FIG. 6) executing an association recognition program 12g to be described later recognizes the taken working target 801 through pattern matching and selects a manual 701 used to work on the working target 801. Then, the aforesaid manual 701 is displayed on the image display 52 and a "unitary moving image" corresponding to this manual 701 is generated. Hereinafter, a description will be given in detail of a configuration of the head mounted display device 200 that realizes those functions.

(Block Diagram of the Head Mounted Display Device of Another Embodiment)

Figure 6:
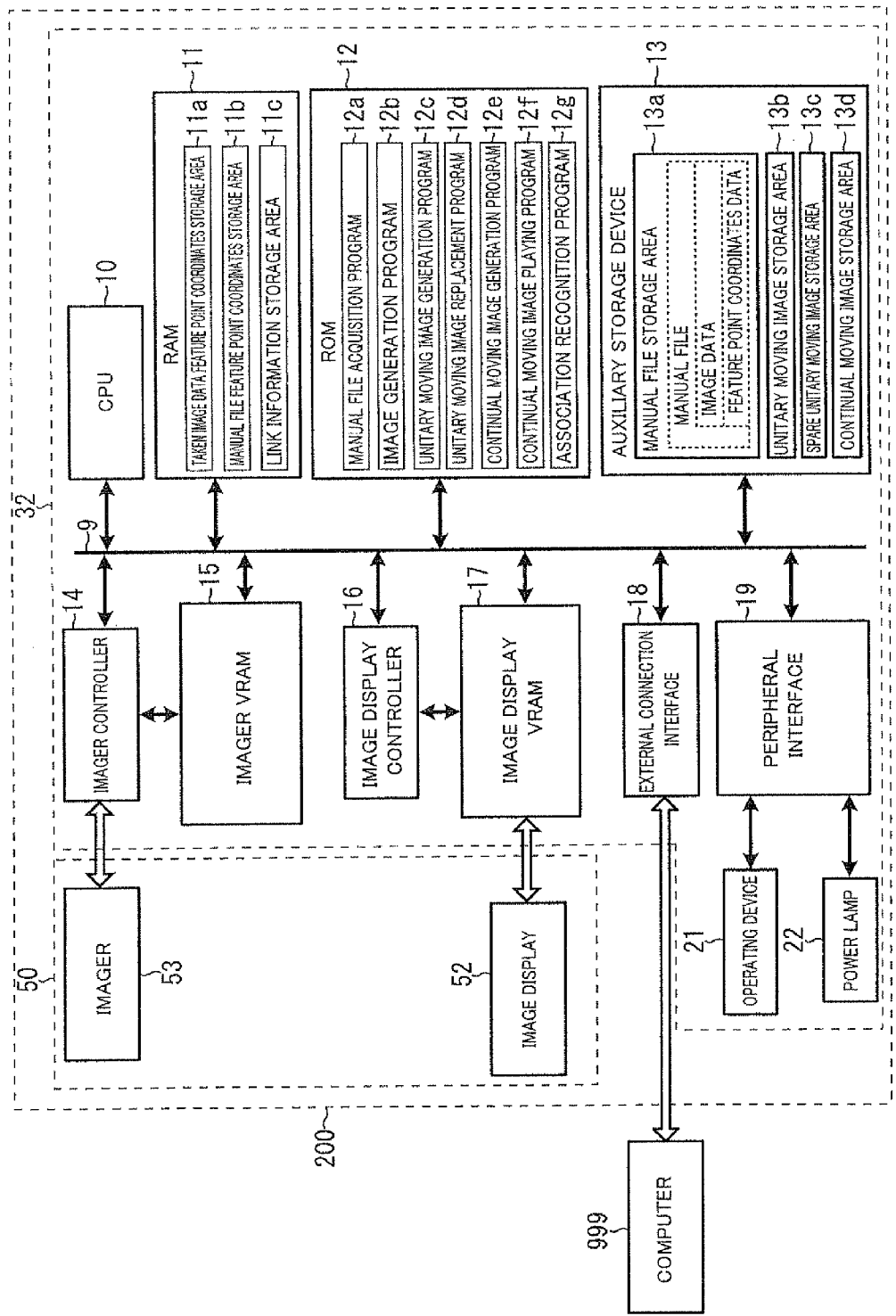
FIG. 6 is a block diagram of a head mounted display device according to a 2nd embodiment.

A description will be given of the differences from the 1st embodiments with reference to a block diagram of the head mounted display device 200 of the 2nd embodiment by using FIG. 6.

In the 2nd embodiment, a "manual file" stored in a manual file storage area 13a includes "image data" and "feature point coordinates data" which are displayed on an image display 52. The "feature point coordinates data" refers to stored data of the coordinates of a "feature point" of the "working target" mutually associated with each piece of the aforesaid "image data."

In the present embodiment, an ROM 12 further stores the association recognition program 12g beforehand. The association recognition program 12g is used to recognize association between the taken working target 801 (see FIG. 8) and a "manual file" which appears on the image display 52. Specifically, the CPU 10 executing the association recognition program 12g acquires 1 frame of an "taken moving image" in which the working target 801 is taken, extracts feature points 850 (see FIG. 8) such as edges of the working target 801, and compares coordinates in the 1 frame of the "taken moving image" of those feature points 850 and "feature point coordinates data" in the aforesaid "manual file" to each other to thereby recognize a "manual file" corresponding to the working target 801.

In the present embodiment, an RAM 11 includes an taken image data feature point coordinates storage area 11a, a manual file feature point coordinates storage area 11b, and a link information storage area 11c.

The taken image data feature point coordinates storage area 11a stores the coordinates of "feature points" of a "working target" in one frame from an "taken moving image" calculated by the CPU 10 executing the association recognition program 12g.

The manual file feature point coordinates storage area 11b stores the "feature point coordinates data" of a "manual file."

The link information storage area 11c stores the "link information" of a "manual file" whose association with the "working target" is recognized by the CPU 10 executing the association recognition program 12g.

(Explanation of Flow of the Continual Moving Image of the Other Embodiment)

Figure 7:
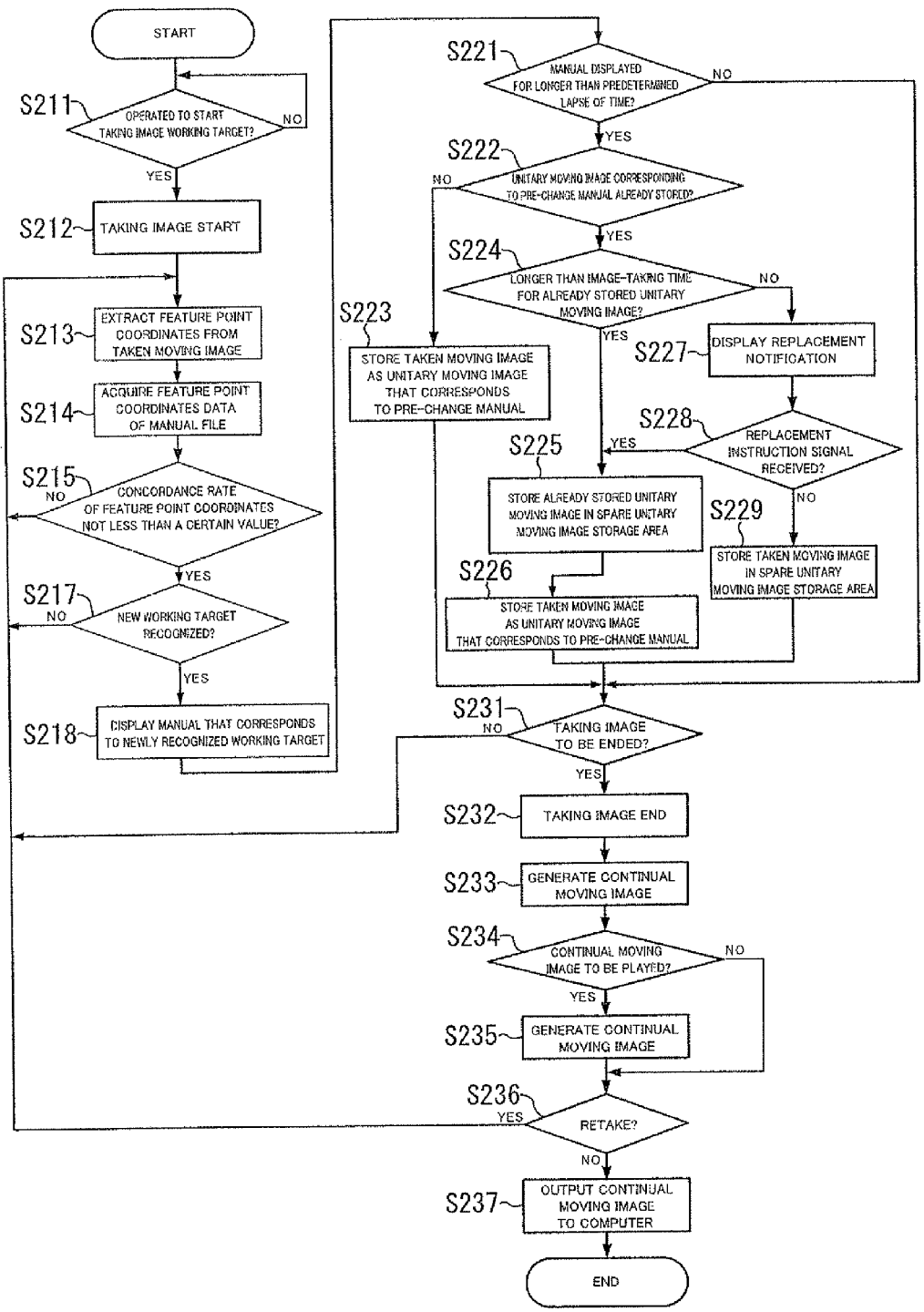
FIG. 7 is a flowchart of the continual moving image generation processing according to the 2nd embodiment.

Hereinafter, a description will be given of the flow of the "continual moving image generation processing" according to the present embodiment with reference to FIG. 7.

When power is applied to the head mounted display device 100 through the operations of the operating device 21 by the user, the process advances to the processing in S211.

In the processing in S211, the CPU 10 determines whether or not a selection is made by the user on the operating device 21 to start taking image a "working target" by using the imager 53. When the CPU 10 determines that it is selected to start taking image of the "working target" by using the imager 53 (YES in S211), the process advances to the processing in S212.

In the processing in S212, the CPU 10 executing the unitary moving image generation program 12c outputs to an imager controller 14 an instruction that commands the imager 53 to start taking image. In the 2nd embodiment, the working target 801 (see FIG. 8) exists in the user's view field direction, so that the working target 801 is taken by the imager 53. The imager controller 14 generates a "taken moving image" and stores it in an imager VRAM 15. When the processing in S212 ends, the process advances to the processing in S213.

Figure 8:
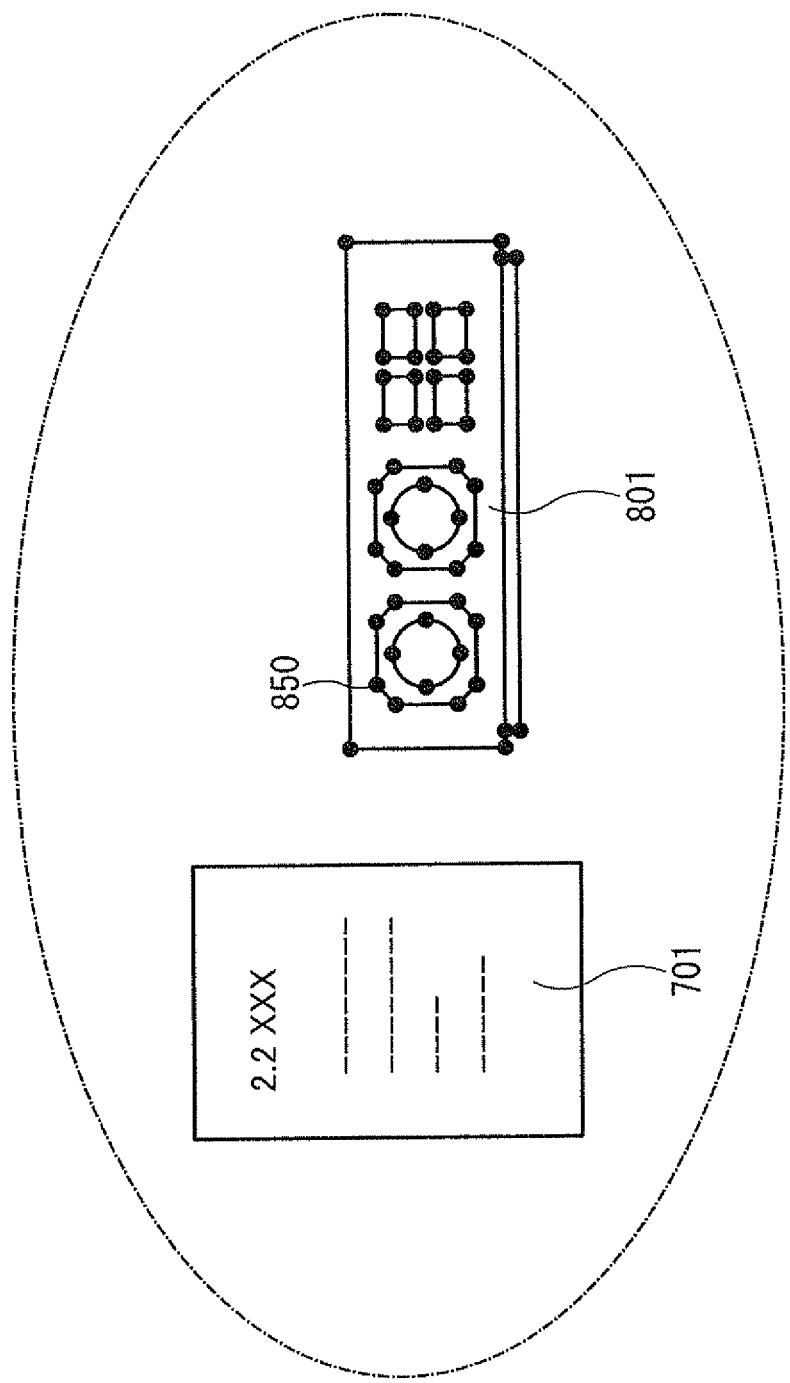
FIG. 8 is an illustration showing the view field of the user (2nd embodiment)

In the processing in S213, the CPU 10 executing the association recognition program 12g acquires one frame from the "taken moving image" stored in the imager VRAM 15, extracts feature points 850 including edges as shown in FIG. 8, calculates coordinates in the "taken moving image" of each of the feature points 850, and stores them in the taken image data feature point storage area 11a in the RAM 11. When the processing in S213 ends, the process advances to the processing in S214.

In the processing in S214, the CPU 10 executing the association recognition program 12g acquires "feature point coordinates data" of a "manual file" from the manual file storage area 13a and stores it in the manual file feature point coordinates storage area 11b in the RAM 11. When the processing in S214 ends, the process advances to the processing in S215.

In the processing in S215, the CPU 10 executing the association recognition program 12g sequentially cross-checks the coordinates of each of the "feature points" of the "working target" stored in the taken image data feature point coordinates storage area 11a and each piece of "feature point coordinates data" stored in the manual file feature point coordinates storage area 11b with each other, thereby determining whether or not there are any pieces of the "feature point coordinates data" having longer than a certain concordance rate of the "feature point coordinates." Specifically, the CPU 10 executing the association recognition program 12g recognizes a shape of the taken "working target" by calculating relative coordinates of the neighboring "feature points" and determines whether or not the shape matches with a shape which is recognized from the feature point coordinates data in the "manual file." In other words, the CPU 10 executing the association recognition program 12g compares the relative coordinates of the neighboring "feature points" in the "working target" with the relative coordinates of the neighboring "feature points" in the "feature point coordinates data" in the "manual file", thereby determining whether or not the concordance rate between those relative coordinates groups is not less than the certain value.

It should be noted that the CPU 10 executing the association recognition program 12g may determine whether or not the "working target" and a shape recognized from the "feature point coordinates data" in the "manual file" by comparing the relative coordinates of the neighboring "feature points" in the "working target" and the relative coordinates of the neighboring "feature points" in the "feature point coordinates data" in the "manual file" with each other.

Further, the CPU 10 executing the association recognition program 12g may determine whether or not the "working target" matches with the shape recognized from the "feature point coordinates data" in the "manual file" through known triangular matching by comparing the relative coordinates of the neighboring "feature points" in the "working target" and the relative coordinates of the neighboring "feature points" in the "feature point coordinates data" in the "manual file" with each other.

It should be noted that in triangular matching, the following method is used to calculate "feature points."
1. The CPU 10 executing the association recognition program 12g selects all possible triangle pairs on the "feature points" in the "feature point coordinates data" and the "working target."
2. The CPU 10 executing the association recognition program 12g obtains x=b/a and y=c/a from three sides a, b, and c (a≥b≥c) and plots them in an x-y plane.
3. The CPU 10 executing the association recognition program 12g determines feature points corresponding to the respective positions in the x-y plane.

In such a manner, by using triangular matching, it is possible to identify a pattern similar to the "working target" even when the coordinate system is different (even when the "working target" is deformed by shift, scale-up/down, or rotation) because the positions of the feature points in the working target change due to a positional relationship (distance and direction) between the "working target" and the user.

When the CPU 10 executing the association recognition program 12g determines that the "feature point coordinates data" has longer than the certain concordance rate of "feature point coordinates" (YES in S215), it recognizes association between the taken "working target" and the compared "manual file", and stores "link information" between this "working target" and this "manual file" in the link information storage area 11c, and then the process advances to the determination processing in S217. On the other hand, when the CPU 10 executing the association recognition program 12g determines that there is no "feature point coordinates data" having longer than the certain concordance rate of "feature point coordinates" (NO in the determination processing in S215), the process returns to the processing in S213.

In the processing in S217, the CPU 10 executing the association recognition program 12g refers to the "link information" stored in the link information storage area 11c, to determine whether or not the "working target" recognized in the processing in S215 is a newly recognized "working target." When the CPU 10 executing the association recognition program 12g determines that the "working target" recognized in the processing in S215 is the newly recognized "working target" (YES in S217), the process advances to the processing in S218. On the other hand, when the CPU 10 executing the association recognition program 12g determines that the "working target" recognized in the processing in S215 is not the newly recognized "working target" (NO in S217), the process returns to processing in S213.

In the processing in S218, the CPU 10 executing the manual file acquisition program 12a refers to the "link information" stored in the link information storage area 11c, to acquire the "image data" of a manual file" that corresponds to the "working target" newly recognized in the processing in S215. Next, the CPU 10 executing the image generation program 12b outputs to the image display controller 16 a drawing instruction that commands generating "display image data" from the "manual file" acquired by the CPU 10 executing the manual file acquisition program 12a. The generated "display image data" is output as an "image signal" to the image display 52, so that the manual 701 is displayed on the image display 52 (see FIG. 8). When the processing in S218 ends, the process advances to the processing in S221.

Hereinafter, steps S221, S222, S223, S224, S225, S226, S227, S228, S229, S231, S232, S233, S234, S235, S236, and S237 in the "continual moving image generation processing" of the 2nd embodiment are the same as steps S121, S122, S123, S124, S125, S126, S127, S128, S129, S131, S132, S133, S134, S135, S136, and S137 in the "continual moving image generation processing" of the 1st embodiment, respectively.

It should be noted that in the processing in S231, when the CPU 10 determines that the "taking image end signal" is not received (NO in S231), the process returns to the processing in S213.

Further, in the processing in S236, when the CPU 10 determines that the "taking image end signal" is received (YES in S236), the process returns to the processing in S213.

In such a manner, in the present embodiment, a "working target" present in a view field direction of the user is recognized automatically, to display a "manual file" corresponding to this recognized "working target" on the image display 52 and also sequentially generate "unitary moving images" corresponding to this "manual file." Accordingly, the user need not select "unitary display images" to be displayed on the image display 52. For example, in the case of creating a work recording moving image about working on the work target, the user can generate a "unitary moving image" as the work recording moving image only by placing the working target in his field of view, thereby saving on labor in the creation of the work recording moving image.

(Outline of a Further Embodiment)

Figure 9:
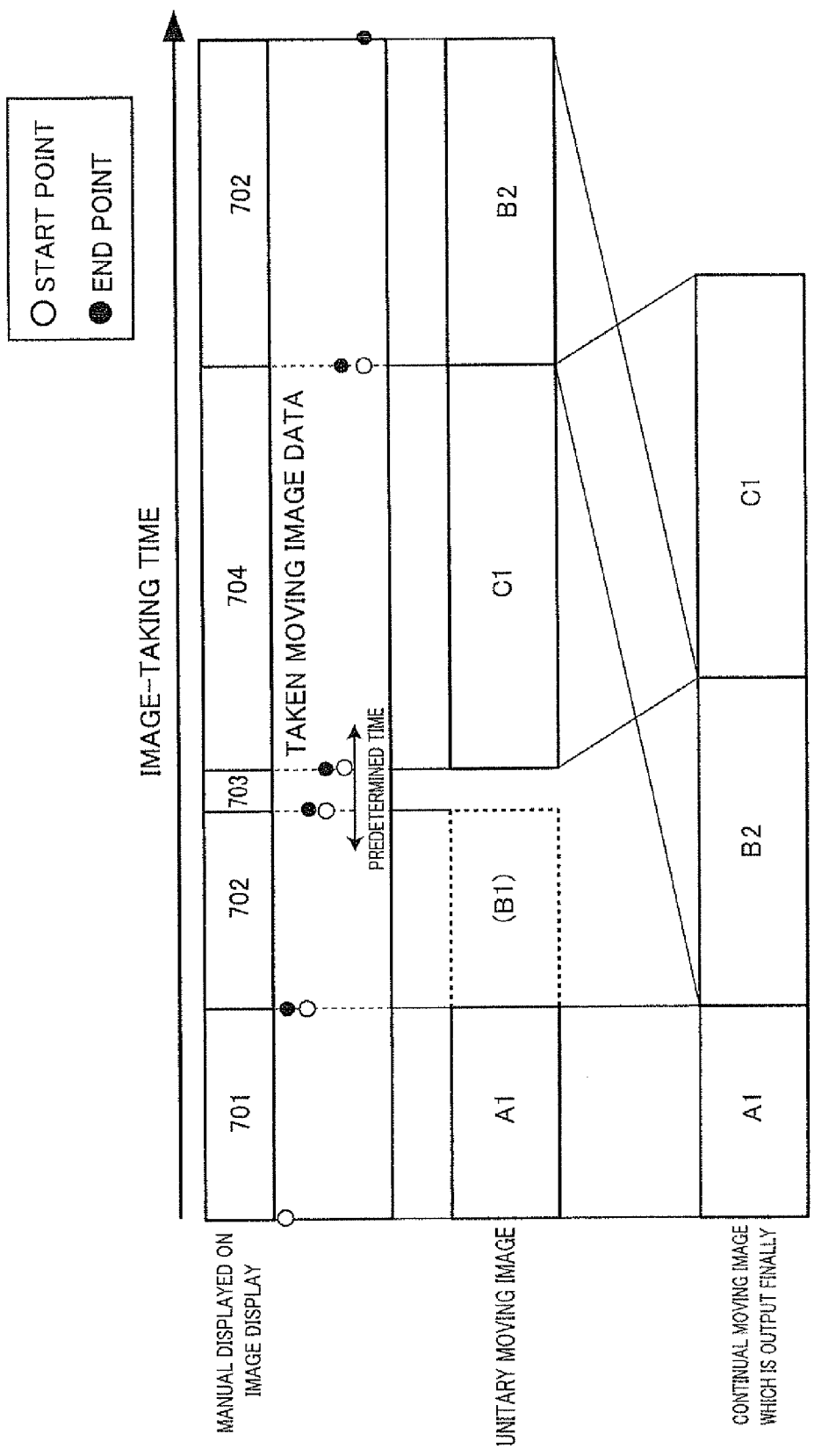
FIG. 9 is an explanatory diagram of an outline according to a 3rd embodiment.

Hereinafter, a description will be given of a head mounted display device 300 about differences from the preceding embodiments with reference to a general diagram of the present embodiment shown in FIG. 9. In the present embodiment, as shown in FIG. 9, when manuals 701 to 704 are displayed on an image display 52, "taken continual moving images" will be generated sequentially, and each time the manuals 701 to 704 are switched one by one, a "start point" and an "end point" will be stored. Then, based on those "start point" and "end point", "unitary moving images" corresponding to the respective manuals 701 to 704 are generated from the sequentially generated "taken moving images", so that those "unitary moving images" are spliced together to generate one coherent "continual moving image." In the embodiment shown in FIG. 9, a unitary moving image B2 is employed as the "unitary moving image" that corresponds to the manual 702, so that a unitary moving image B1 will not be generated actually. Hereinafter, a description will be given in detail of a configuration of the head mounted display device 300 that realizes such functions.

(Block Diagram of Head Mounted Display of the Further Embodiment)

Figure 10:
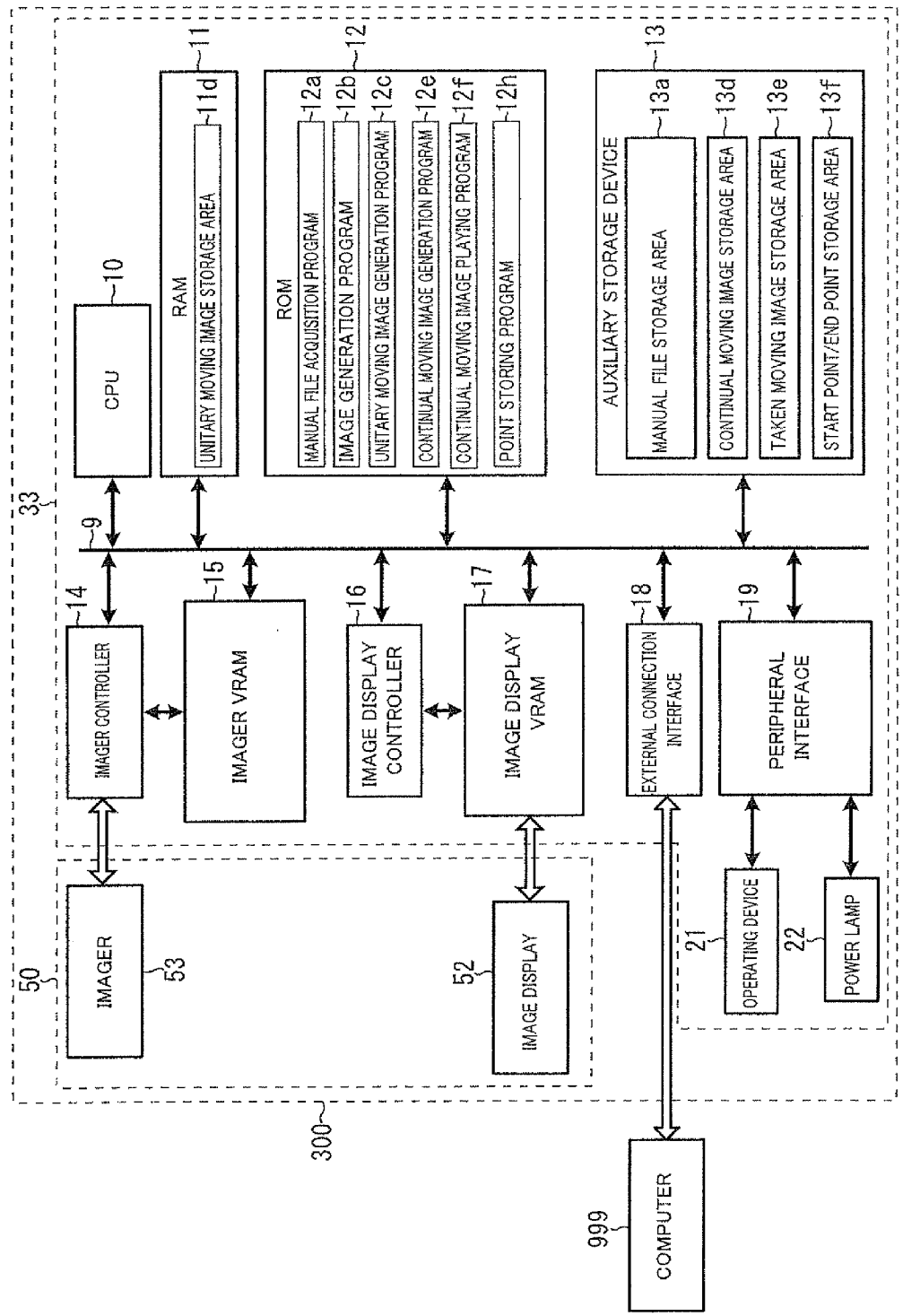
FIG. 10 is a block diagram of a head mounted display device according to the 3rd embodiment.

A description will be given of the block diagram of the head mounted display device 300 of the present embodiment about differences from that of the 1st embodiment with reference to FIG. 10. In the present embodiment, an auxiliary storage device 13 further includes a taken moving image storage area 13*e* and a start point/end point storage area 13*f*. It should be noted that in the present embodiment, a unitary moving image storage area 13*b* and a spare unitary moving image storage area 13*c* are not indispensable.

The taken moving image storage area 13*e* stores "taken moving images" generated by an imager controller 14. It should be noted that even when "manual files" to be displayed on the image display 52 are switched from each other, the "taken moving images" will be stored in the "taken moving image storage area 13*e* sequentially.

The start point/end point storage area 13*f* stores a "manual file" and a "start point/end point file" (see FIG. 12) in which a "start point", an "end point", and a "priority" which are correlated with this "manual file."

In the present embodiment, an RAM 11 includes a unitary moving image storage area 1*i*d in which generated "unitary moving images" are stored temporarily.

In the present embodiment, an ROM 12 stores a point storing program 12*h* beforehand. The CPU 10 executing the point storing program 12*h* stores a time at which the image display 52 started displaying a "manual file" into the column of "start point." Further, the CPU 10 executing the point storing program 12*h* stores a time at which display of a "manual file" on the image display 52 ended into the column of "end point." Specifically, the CPU 10 executing the point storing program 12*h* reads an "operation signal" which is output when a "manual file" displayed on the image display 52 is switched through the operations of an operating device 21 by the user, thereby recognizing a "start point" and an "end point" that correspond to the "manual file."

In the present embodiment, a unitary moving image replacement program 12*d* is not indispensable.

In the present embodiment, the CPU 10 executing the unitary moving image generation program 12*c* refers to the "start point" and the "end point" stored in the start point/end point file storage area 13*f*, to recognize a start time and the end time of a "taken moving image", thereby generating a "unitary moving image" that corresponding to each of the "manual files." The generated "unitary moving image" is stored in the unitary moving image storage area 1*i*d in the RAM 11 temporarily.

(Description of Flow of Continual Moving Image Generation Processing of the Further Embodiment)

Figure 11:
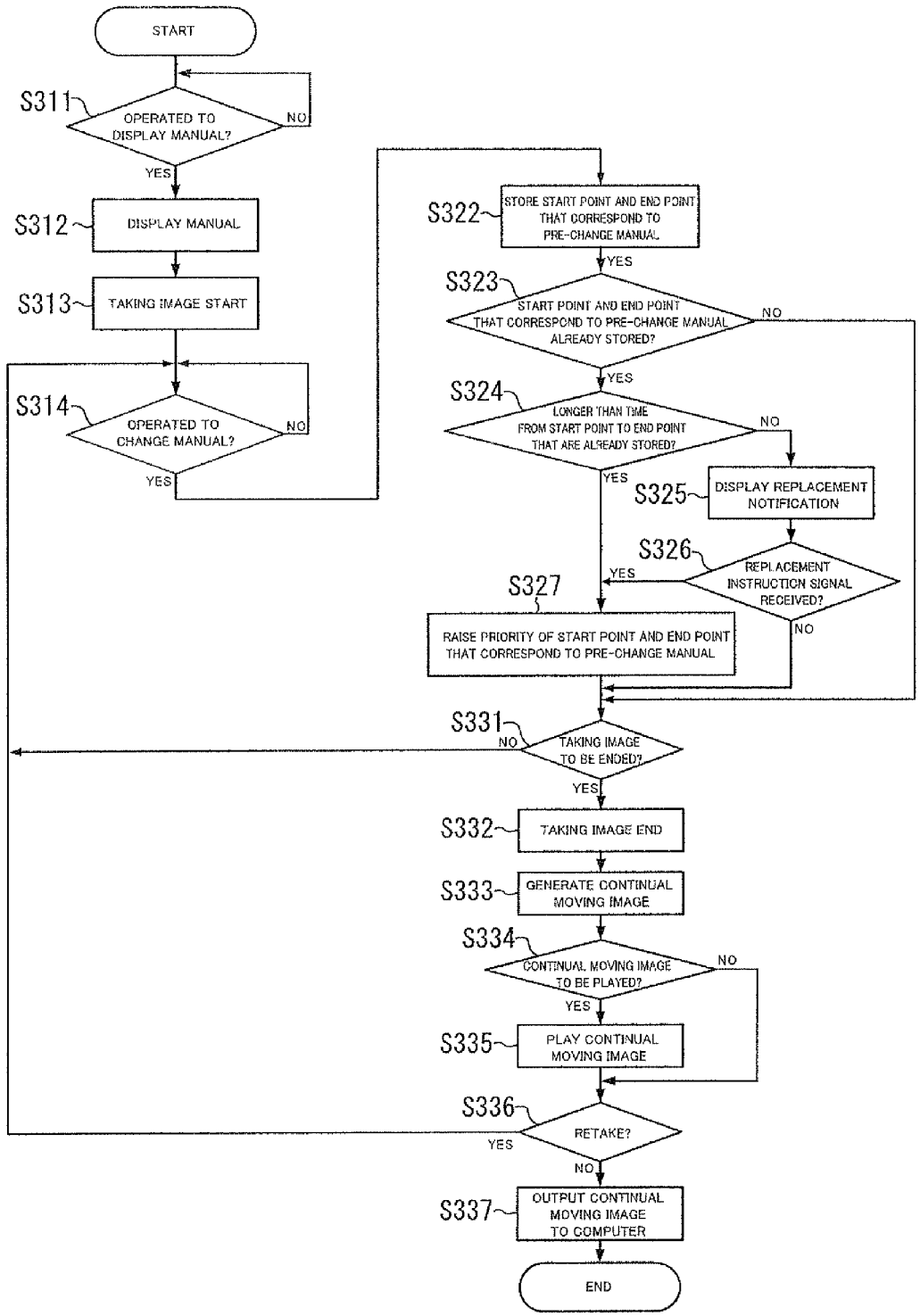
FIG. 11 is a flowchart of continual moving image generation processing according to the 3rd embodiment.

Hereinafter, a description will be given of the flow of the "continual moving image generation processing" according to the present embodiment with reference to FIG. 11. When power is applied to the head mounted display device 300 through the operations of the operating device 21 by the user, the process advances to the processing in S311.

In the processing in S311, when the CPU 10 executing a manual file acquisition program 12*a* detects an "operation signal" that commands the image display 52 to display a "manual file" through the operations of the operating device 21 by the user (YES in S311), the process advances to the processing in S312. At the same time, the CPU 10 executing the point storing program 12*h* reads the aforesaid "operation signal", to recognize the time of a "start point" of the "manual file" displayed on the image display 52.

In the processing in S312, based on the "operation signal" detected in the processing in S311, the CPU 10 executing the manual file acquisition program 12*a* acquires the "manual file" stored in the manual file storage area 13*a*. Next, the CPU 10 executing the image generation program 12*b* outputs to the image display controller 16 a drawing instruction that commands generating "display image data" from the "manual file" acquired by the CPU 10 executing the manual file acquisition program 12*a*. The generated "display image data" is output as an "image signal" to the image display 52, so that the "manual" is displayed on the image display 52. When the processing in S312 ends, the process advances to the processing in S313.

In the processing in S313, the CPU 10 outputs to an imager controller 14 an instruction that commands an imager 53 to start taking image. The imager controller 14 generates a "taken moving image" and stores it in an imager VRAM 15. The "taken moving images" stored in the imager VRAM 15 are sequentially stored in the taken moving image storage area 13*e*. When the processing in S313 ends, the process advances to the processing in S314.

In the processing in S314, the CPU 10 executing the manual file acquisition program 12*a* determines whether or not an "operation signal" is output through the operations of the operating device 21 by the user, thereby deciding whether or not operations are performed to change the "manual file" to be displayed on the image display 52. When the CPU 10 executing the manual file acquisition program 12*a* determines that the operations have been performed to change the "manual file" (YES in S314), the CPU 10 executing the image generation program 12*b* outputs to the image display controller 16 a drawing instruction that commands generating the "display image data" from the "manual file" selected by the user, and the process advances to the processing in S322. At the same time, the CPU 10 executing the point storing program 12*h* reads this "operation signal", thereby recognizing a time of the "end point" of the "manual file" which had been displayed on the image display 52 up to that time and a time of the "start point" of the post-change "manual file" to be displayed on the image display 52.

In the processing in S322, the CPU 10 executing the point storing program 12*h* updates the "start point" and the "end point" and stores them in the "start point/end point file" stored in the start point/end point storage area 13*f* in a condition where they are correlated with the pre-change "manual file." When the processing in S322 ends, the process advances to the processing in S323.

In the processing in S323, the CPU 10 refers to the start point/end point storage area 13f, to determine whether or not the "start point" and the "end point" that correspond to the pre-change "manual file" are already stored in the "start point/end point file." When the CPU 10 determines that the "start point" and the "end point" that correspond to the pre-change "manual file" have already been stored in the "start point/end point file" (YES in S323), the process advances to the processing in S324. On the other hand, when the CPU 10 determines that the "start point" and the "end point" that correspond to the pre-change "manual file" are not stored in the "start point/end point file" (NO in S323), the process advances to the processing in S331.

In the processing in S324, the CPU 10 determines whether or not a lapse of time from the "start point" to the "end point" that correspond to the pre-change "manual file" is longer than a lapse of time from the "start point" to the "end point" that are already stored in the "start point/end point file" of the same "manual file." When the CPU 10 determines that the lapse of time from the "start point" to the "end point" that correspond to the pre-change "manual file" is longer than that from the "start point" to the "end point" that are already stored in the "start point/end point file" of the same "manual file" (YES in S324), the process advances to the processing in S327. On the other hand, when the CPU 10 determines that the lapse of time from the "start point" to the "end point" that correspond to the pre-change "manual file" is shorter than that from the "start point" to the "end point" that are already stored in the "start point/end point file" of the same "manual file" (NO in S324), the process advances to the processing in S325.

In the processing in S325, the CPU 10 outputs to the image display controller 16 a drawing instruction that commands the image display 52 to display a "replacement notification." When the processing in S325 ends, the process advances to the processing in S326.

In the processing in S326, the CPU 10 determines whether or not the "replacement instruction signal" is received via a peripheral interface 19. When the CPU 10 determines that the "replacement instruction signal" is received through the operations of the operating device 21 by the user (YES in S326), the process advances to the processing in S327. On the other hand, when the CPU 10 determines that the "replacement instruction signal" is not received within a valid period of a predetermined lapse of time (several seconds) (NO in S326), the process advances to the processing in S331.

In the processing in S327, the CPU 10 executing the point storing program 12h raises the "priority" that corresponds to the pre-change "manual file" in a condition where it is updated and stored in the processing in S322 to a higher priority level and stores it in the "start point/end point file." When the processing in S327 ends, the process advances to the processing in S331.

In the processing in S331, the CPU 10 determines whether or not an "taking image end signal" is received via the peripheral interface 19. When the CPU 10 determines that the "taking image end signal" has been received through the operations of the operating device 21 by the user (YES in S331), the process advances to the processing in S332. On the other hand, when the CPU 10 determines that the "taking image end signal" is not received (NO in S331), the process advances to the processing in S314.

In the processing in S332, the CPU 10 outputs to the imager controller 14 with an instruction that commands the imager 53 to stop taking image. When the processing in S332 ends, the process advances to the processing in S333.

In the processing in S333, the CPU 10 executing the unitary moving image generation program 12b refers to the "start point/end point file" stored in the start point/end point storage area 13f, to recognize the "start point" and the "end point" that correspond to each "manual file", thereby generating a "unitary moving image" that corresponds to this "manual file" from the "taken moving images" stored in the taken moving image storage area 13e and storing it in the unitary moving image storage area lid in the RAM 11. It should be noted that the CPU 10 executing the unitary moving image generation program 12b will generate no "unit moving images" of a predetermined lapse of time (several seconds) or shorter as shown in FIG. 9. This is because in the processing in S314, when a desired manual file" to be displayed on the image display 52 is already searched for through the operations of the operating device 21 by the user, it need not be generated as a "unitary moving image." Further, when a plurality of pairs of "start point" and "end point" about the same "manual file" are stored in the "start point/end point file", the CPU 10 executing the unitary moving image generation program 12b recognizes the paired "start point" and "end point" that have the highest "priority" and, based on those "start point" and "end point", generates a "unitary moving image."

Then, the CPU 10 executing the continual moving image generation program 12e splices together the "unitary moving images" stored in the unitary moving image storage area lid to generate one coherent (one file of) "continual moving image" (see FIG. 9) and stores it in the continual moving image storage area 13d. When the processing in S333 ends, the process advances to the processing in S334.

In the processing in S334, the CPU 10 determines whether or not a "continual moving image playing signal" is received via the peripheral interface 19. When the CPU 10 determines that the "continual moving image playing signal" has been received through the operations of the operating device 21 by the user (YES in S334), the process advances to the processing in the processing in S335. On the other hand, when the CPU 10 determines that the "continual moving image playing signal" is not received (NO in S334), the process returns to determination processing in S336.

In the processing in S335, the CPU 10 executing the continual moving image playing program 12f outputs to the image display controller 16 a drawing instruction that commands the image display 52 to display the "continual moving image" stored in the continual moving image storage area 13d and a "manual file" that corresponds to "unitary moving images" that constitute this "continual moving image" in a condition where they are positioned in parallel with each other. The user can confirm the outcome of the completed "continual moving image" by simultaneously viewing the "continual moving image" and the "manual file" displayed on the image display 52 in a condition where they are positioned in parallel with each other. When the processing in S335 ends, the process advances to the processing in the processing in S336.

In the processing in S336, the CPU 10 determines whether or not the "retaking instruction signal" is received via the peripheral interface 19. When the CPU 10 determines that the "retaking instruction signal" has been received through the operations of the operating device 21 by the user (YES in S336), the process returns to the determination processing in S314. On the other hand, when the CPU 10 determines that the "retaking instruction signal" is not received (NO in S336), the process advances to the processing in S337.

In the processing in S337, the "continual moving image" stored in the continual moving image storage area 13d is output to the computer 999 via the external connection interface 18. When the processing in S337 ends, the "continual moving image generation processing" ends, so that power of the head mounted display device 300 will be cut off.

In such a manner, in the present embodiment, the "unitary moving images" correlated with a "unitary display image" to be displayed on the image display 52 will automatically be created sequentially. Therefore, the user need not perform after-the-fact correlation of the "unitary display image data" and the taken "unitary moving image."

Of course, it is possible to combine the above technical concept of the present embodiment and that of the aforesaid embodiments.

(General Overview)

Although the above-described embodiments have employed a two-body structure including the head-worn unit 50 and each of the control units 31 to 33 as the head mounted display devices 100 to 300, respectively, the head mounted display device may be of a single-body structure.

Although the above-described embodiments store a "manual file" in the manual file storage area 13a in the auxiliary storage device 13, it is also possible to store the "manual file" in an external apparatus such as the computer 999 beforehand so that the "manual file" may be acquired via the external connection interface 18.

Although the above-described embodiments have generated a "continual moving image" from "unitary moving images" correlated with a "manual file" and output this "continual moving image" to the computer 999, those "unitary moving images" may be output to the computer 999 in a condition where their playing order is specified.

Although the above-described embodiments display a "manual file" on the image display 52 and generate a "continual moving image" from "unitary moving images" mutually correlated with this "manual file", the image to displayed on the image display 52 is not limited to the "manual file" but may be a so-called business software "document file", a "still image file", a "moving image file", or "unitary display image data" comprised of a plurality of pages of those "document file", "still image file", and "moving image file" so that a "continual moving image" would be generated from "unitary moving images" mutually correlated with the "unitary display image. "In a case where the "unitary display image data" is comprised of a plurality of pages, such a configuration may be employed that each time the page is switched, the "unitary moving image" is generated.

Although there has been hereinabove described the present invention with reference to the embodiments considered to be most practical and preferable, it should be appreciated that the present invention is not limited to the embodiments disclosed in the present specification and can be appropriately modified with in the gist and the idea of the present invention that can be read from the claims or the specification as a whole, so that its various modifications should all be considered to be within the technical scope of the present invention.

What is claimed is:

1. A head mounted display device comprising:
    an image display that is mounted on the head of a user to permit the user to visually recognize an image;
    an imager that takes an image in a direction of a field of view of the user and generates a taken moving image;
    a processor configured to execute instructions grouped into functional units, the instructions including:
    a unitary display image data acquisition unit that acquires unitary display image data which is to be displayed on the image display;
    a unitary moving image display that generates a unitary moving image correlated with the unitary display image from the moving image generated by the imager for each of the unitary display images which are displayed on the image display;
    a determination unit that, when any other unitary moving image correlated with the same unitary display image corresponding to one of the unitary moving images is generated, determines whether to replace the one of the unitary moving images with the any other unitary moving image; and
    a continual moving image display that, when the determination unit determines that the one of the unitary moving images should be replaced with the any other unitary moving image, replaces the one of the unitary moving image and combines unitary moving images that are not replaced and any other unitary moving image to generate coherent continual moving image.

2. The head mounted display device according to claim 1, wherein
    the unitary moving image display generates the any other unitary moving image when an image-taking time is longer than a predetermined lapse of time.

3. The head mounted display device according to claim 1, further comprising:
    an operating device that is operated by the user, wherein
    the continual moving image display determines whether to replace the unitary moving image through operations of the operating device by the user.

4. The head mounted display device according to claim 1, further comprising:
    a spare unitary moving image storage device that stores the one of the unitary moving images replaced with the any other unitary moving image by the continual moving image display.

5. The head mounted display device according to claim 1, wherein
    the continual moving image display replaces the one of the unitary moving images with the any other unitary moving image when the image-taking time for the any other unitary moving image is longer than the image-taking time for the 1 of the unitary moving images.

6. The head mounted display device according to claim 1, wherein
    the unitary moving image display generates a new unitary moving image when the unitary display image which is to be displayed on the image display is changed.

7. The head mounted display device according to claim 1, wherein
    the processor is configured to further execute the instructions grouped into functional units, the instructions further including:
    an association recognition unit that recognizes association of the taken moving image and the unitary display image, wherein
    the unitary display image data acquisition unit acquires the unitary display image data associated with the taken moving image recognized by the association recognition unit,
    the image display displays the acquired unitary display image data,
    the unitary moving image display generates a new unitary moving image when the association is recognized by the association recognition unit, and when erasure of the association is recognized by the association recognition unit, quits generation of the new unitary moving image.

8. The head mounted display device according to claim 1, wherein the association recognition unit acquires positions of a plurality of taken feature points, which are feature points included in the taken moving image, acquires the positions of a plurality of display feature points, which are the feature points registered in a condition where they are associated with the unitary display image, and compares the positions of the plurality of taken feature points and the positions of the plurality of display feature points, thereby recognizing the association.

9. The head mounted display device according to claim 1, wherein the processor is configured to further execute the instructions grouped into functional units, the instructions further including:

a continual moving image playing unit that causes the image display to display the continual moving image and the unitary display image that corresponds to the unitary, moving images that constitute the continual moving image.

\* \* \* \* \*